US012444353B2

(12) United States Patent
Wu et al.

(10) Patent No.: US 12,444,353 B2
(45) Date of Patent: Oct. 14, 2025

(54) CONTROL METHOD AND APPARATUS FOR DISPLAY PANEL, AND DISPLAY APPARATUS

(71) Applicant: BOE Technology Group Co., Ltd., Beijing (CN)

(72) Inventors: Baoyun Wu, Beijing (CN); Xinbin Han, Beijing (CN); Xiyu Zhao, Beijing (CN); Hui Zhao, Beijing (CN); Kaimin Wang, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/915,107

(22) PCT Filed: Nov. 25, 2021

(86) PCT No.: PCT/CN2021/133244

§ 371 (c)(1),
(2) Date: Sep. 28, 2022

(87) PCT Pub. No.: WO2023/092405

PCT Pub. Date: Jun. 1, 2023

(65) Prior Publication Data

US 2024/0212606 A1 Jun. 27, 2024

(51) Int. Cl.
*G09G 3/3233* (2016.01)

(52) U.S. Cl.
CPC ..... *G09G 3/3233* (2013.01); *G09G 2310/027* (2013.01); *G09G 2310/061* (2013.01); *G09G 2310/08* (2013.01)

(58) Field of Classification Search
CPC ........... G09G 3/3233; G09G 2310/027; G09G 2310/061; G09G 2310/08
See application file for complete search history.

(56) References Cited

U.S. PATENT DOCUMENTS

| | | | | |
|---|---|---|---|---|
| 2010/0302287 A1* | 12/2010 | Katayama | G09G 3/3648 345/211 |
| 2014/0071184 A1* | 3/2014 | Lu | G09G 3/3648 345/89 |
| 2018/0336824 A1* | 11/2018 | Yang | G09G 3/3258 |
| 2019/0378473 A1* | 12/2019 | Kuo | G09G 3/20 |

(Continued)

FOREIGN PATENT DOCUMENTS

| | | |
|---|---|---|
| CN | 101739973 A | 6/2010 |
| CN | 102842299 A | 12/2012 |

(Continued)

*Primary Examiner* — Md Saiful A Siddiqui
(74) *Attorney, Agent, or Firm* — Ling Wu; Stephen Yang; Ling and Yang Intellectual Property

(57) ABSTRACT

A control method for a display panel includes: converting gray data of a display picture into a gray voltage at a first refresh frequency; calculating an average gray voltage of the display picture according to the gray voltage of the display picture; determining, according to the average gray voltage of the display picture, a display parameter matched with the display picture; and outputting a control signal of the display picture to the display panel, according to the display parameter matched with the display picture. The control signal includes at least one of the followings: a data keep signal, and an anode reset signal of a light emitting element of the display panel.

16 Claims, 4 Drawing Sheets

(56) References Cited

U.S. PATENT DOCUMENTS

| | | | | |
|---|---|---|---|---|
| 2020/0160788 | A1 | 5/2020 | Son | |
| 2020/0175924 | A1* | 6/2020 | Bang | G09G 3/3233 |
| 2020/0388229 | A1 | 12/2020 | Zhang et al. | |
| 2021/0158755 | A1 | 5/2021 | Li et al. | |
| 2021/0233457 | A1* | 7/2021 | Xiong | G09G 3/2074 |
| 2021/0327352 | A1 | 10/2021 | Zhang et al. | |
| 2022/0076646 | A1* | 3/2022 | Chen | G06T 7/90 |
| 2022/0122236 | A1* | 4/2022 | Yu | G09G 5/10 |
| 2022/0223107 | A1 | 7/2022 | Chen et al. | |
| 2023/0093204 | A1* | 3/2023 | Latif | G06F 11/3438 345/173 |
| 2024/0078952 | A1* | 3/2024 | Choi | G09G 3/3233 |

FOREIGN PATENT DOCUMENTS

| | | | |
|---|---|---|---|
| CN | 107369419 | A | 11/2017 |
| CN | 111276095 | A | 6/2020 |
| CN | 111583866 | A | 8/2020 |
| CN | 111710300 | A | 9/2020 |
| CN | 111862890 | A | 10/2020 |
| CN | 112509519 | A | 3/2021 |
| CN | 112634832 | A | 4/2021 |
| CN | 113192458 | A | 7/2021 |

* cited by examiner

CONTROL METHOD AND APPARATUS FOR DISPLAY PANEL, AND DISPLAY APPARATUS

CROSS-REFERENCE TO RELATED APPLICATION

The present application is a U.S. National Phase Entry of International Application No. PCT/CN2021/133244 having an international filing date of Nov. 25, 2021, the entire content of which is hereby incorporated by reference.

TECHNICAL FIELD

The present disclosure relates to, but is not limited to, the field of display technologies, and particularly to a control method and apparatus for a display panel, and a display apparatus.

BACKGROUND

An Organic Light Emitting Display (OLED) display device is considered as a new application technology of a next generation flat panel display due to its excellent characteristics such as self-luminescence, a high contrast, a small thickness, a wide viewing angle, a fast response speed, applicability for a flexible panel, a wide range of a use temperature, a simple structure and manufacturing process, and the like.

SUMMARY

The following is a summary of subject matters described herein in detail. The summary is not intended to limit the protection scope of claims.

Embodiments of the present disclosure provide a control method and apparatus for a display panel, and a display apparatus.

In an aspect, an embodiment of the present disclosure provides a control method for a display panel, which includes: converting gray data of a display picture into a gray voltage at a first refresh frequency; calculating an average gray voltage of the display picture according to the gray voltage of the display picture; determining, according to the average gray voltage of the display picture, a display parameter matched with the display picture; and outputting a control signal of the display picture to the display panel, according to the display parameter matched with the display picture. The control signal includes at least one of the followings: a display data keep signal, and an anode reset signal of a light emitting element of the display panel.

In some exemplary embodiments, a display stage of the display picture includes: a refresh stage and a keep stage. The display parameter includes at least one of the followings: a display data keep voltage of the keep stage; and a first anode initial voltage of the refresh stage and a second anode initial voltage of the keep stage.

In some exemplary embodiments, converting the gray data of the display picture into the gray voltage includes: for gray data of each display unit of the display picture, looking for a gray voltage corresponding to the gray data in a stored gray conversion comparison table.

In some exemplary embodiments, converting the gray data of the display picture into the gray voltage further includes: if the gray voltage corresponding to the gray data of a display unit is not found in the gray conversion comparison table, calculating the gray voltage corresponding to the gray data by utilizing a preset gray mapping function.

In some exemplary embodiments, calculating the average gray voltage of the display picture according to the gray voltage of the display picture includes: calculating an average value of gray voltages of each display line of the display picture, and then calculating the average gray voltage of the display picture by utilizing average values of gray voltages of all display lines.

In some exemplary embodiments, determining, according to the average gray voltage of the display picture, the display parameter matched with the display picture includes: looking for a display parameter matched with the average gray voltage of the display picture from a stored parameter comparison table. Herein, the parameter comparison table records at least one of the followings: a mapping relationship between an average gray voltage and a display data keep voltage, and a mapping relationship between an average gray voltage, and a first anode initial voltage and a second anode initial voltage.

In some exemplary embodiments, the average gray voltage is directly proportional to the display data keep voltage in the parameter comparison table; and the average gray voltage is inversely proportional to an absolute value of a voltage difference between the first anode initial voltage and the second anode initial voltage in the parameter comparison table.

In some exemplary embodiments, outputting the control signal of the display picture to the display panel, according to the display parameter matched with the display picture includes at least one of the followings: outputting the display data keep signal to the display panel in the keep stage, wherein the display data keep signal is maintained at the display data keep voltage; and outputting the anode reset signal to the display panel, wherein the anode reset signal is maintained at the first anode initial voltage in the refresh stage and at the second anode initial voltage in the keep stage.

In some exemplary embodiments, the first refresh frequency is less than 60 Hz.

In another aspect, an embodiment of the present disclosure provides a control apparatus for a display panel, which includes: a gray conversion module, a voltage calculation module, a parameter conversion module, and a signal output module. The gray conversion module is configured to convert gray data of a display picture into a gray voltage at a first refresh frequency. The voltage calculation module is configured to calculate an average gray voltage of the display picture according to the gray voltage of the display picture. The parameter conversion module is configured to determine a display parameter matched with the display picture according to the average gray voltage of the display picture. The signal output module is configured to output a control signal of the display picture to the display panel according to the display parameter matched with the display picture. The control signal includes at least one of the followings: a display data keep signal, and an anode reset signal of a light emitting element of the display panel.

In some exemplary embodiments, a display stage of the display picture includes: a refresh stage and a keep stage. The display parameter includes at least one of the followings: a display data keep voltage of the keep stage; and a first anode initial voltage of the refresh stage and a second anode initial voltage of the keep stage.

In some exemplary embodiments, the parameter conversion module includes: a first parameter conversion module, a second parameter conversion module, and a third parameter conversion module. The first parameter conversion module is configured to determine, according to the average gray voltage of the display picture, the first anode initial voltage matched with the display picture. The second parameter conversion module is configured to determine, according to the average gray voltage of the display picture, the second anode initial voltage matched with the display picture. The third parameter conversion module is configured to determine, according to the average gray voltage of the display picture, the display data keep voltage matched with the display picture.

In some exemplary embodiments, the signal output module includes: a first output module and a second output module. The first output module is configured to output the anode reset signal of the display picture to the display panel according to the display parameter matched with the display picture. The second output module is configured to output the display data keep signal of the display picture to the display panel according to the display parameter matched with the display picture.

In another aspect, an embodiment of the present disclosure provides a display apparatus, which includes: a display panel and the control apparatus as described above, wherein the control apparatus is configured to provide a control signal to the display panel.

In some exemplary embodiments, the display panel includes: a pixel array, wherein the pixel array includes multiple sub-pixels, and at least one sub-pixel includes a light emitting element and a pixel circuit driving the light emitting element to emit light; and the pixel circuit includes multiple transistors and at least one capacitor.

In another aspect, an embodiment of the present disclosure provides a control apparatus, which includes: a memory and a processor; the memory is configured to store a computer program, and the processor is configured to execute the computer program to implement the control method as described above.

In another aspect, an embodiment of the present disclosure provides a non-transitory computer readable storage medium, which stores a computer program. The control method as described above is implemented when the computer program is performed.

Other aspects may be understood upon reading and understanding the drawings and the detailed description.

BRIEF DESCRIPTION OF DRAWINGS

Accompanying drawings are used for providing further understanding of technical solutions of the present disclosure, constituting a part of the specification, and together with the embodiments of the present disclosure, are used for explaining the technical solutions of the present disclosure but not constituting limitations on the technical solutions of the present disclosure. Shapes and sizes of one or more components in the drawings do not reflect true scales, but are only intended to schematically describe contents of the present disclosure.

DETAILED DESCRIPTION

Figure 1:
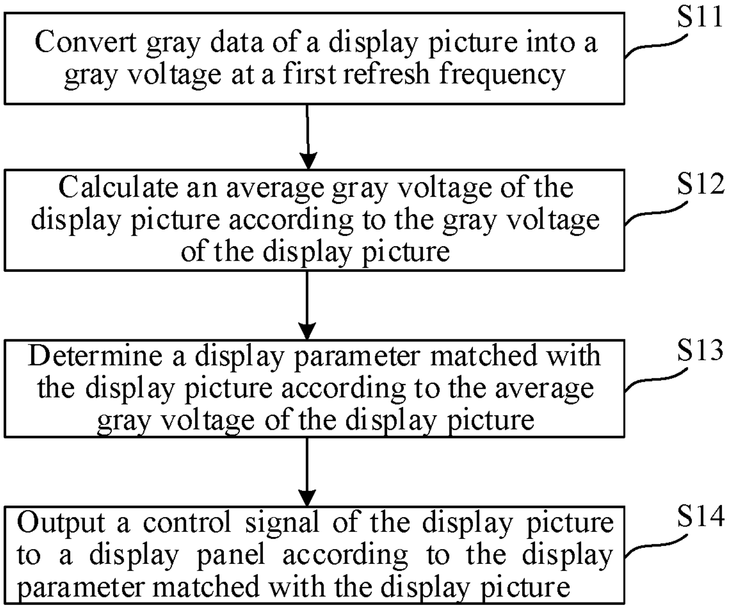
FIG. 1 is a flowchart of a control method for a display panel according to at least one embodiment of the present disclosure.

The embodiments of the present disclosure will be described below in combination with the drawings in detail. Implementation modes may be implemented in multiple different forms. Those of ordinary skill in the art may easily understand such a fact that manners and contents may be transformed into other forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the drawings, a size of one or more constituent elements, a thickness of a layer, or a region is sometimes exaggerated for clarity. Therefore, a mode of the present disclosure is not necessarily limited to the size, and a shape and a size of one or more components in the drawings do not reflect a true proportion. In addition, the drawings schematically illustrate ideal examples, and an embodiment of the present disclosure is not limited to the shapes, numerical values, or the like shown in the drawings.

Ordinal numerals such as "first", "second", and "third" in the specification are set to avoid confusion of constituent elements, but are not to set a limit in quantity. In the present disclosure, "multiple" represents two or more than two.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to directions of the constituent elements described. Thus, appropriate replacements can be made according to situations without being limited to the wordings described in the specification.

In the specification, unless otherwise specified and defined explicitly, terms "mount", "mutually connect", and "connect" should be understood in a broad sense. For example, it may be a fixed connection, a detachable connection, or an integrated connection; it may be a mechanical connection or a connection; it may be a direct connection, an indirect connection through an intermediate component, or communication inside two components. Those of ordinary skills in the art may understand meanings of the above-mentioned terms in the present disclosure according to situations.

In the specification, "electrical connection" includes a case that constituent elements are connected together through an element with a certain electrical effect. The "element with a certain electrical effect" is not particularly limited as long as electrical signals may be transmitted between the connected constituent elements. Examples of the "element with a certain electrical effect" not only include an electrode and a wiring, but further include a switch element such as a transistor, a resistor, an inductor, a capacitor, another element with multiple functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 800 and below 100°, and thus also includes a state in which the angle is above 850 and below 95°.

In the present disclosure, "about" and "approximately" refers to that a boundary is defined not so strictly and numerical values within process and measurement error ranges are allowed.

With an application of a Low Temperature Polycrystalline Oxide (LTPO) technology, a refresh frequency of a picture of an OLED display panel may be reduced to 1 Hz or even lower. Since a brightness change frequency recognizable by human eyes is about 24 Hz to 30 Hz, for a display panel based on the LTPO technology, when displaying at a low frame rate (i.e., lower than a conventional refresh frequency of 60 Hz), a brightness of a whole picture needs to be kept constant, and a low frame rate brightness change cannot be introduced in a display process.

Embodiments of the present disclosure provide a control method for a display panel, a control apparatus for a display panel, and a display apparatus, which may improve a display effect of the display panel.

FIG. 1 is a flowchart of a control method for a display panel according to at least one embodiment of the present disclosure. As shown in FIG. 1, an embodiment of the present disclosure provides a control method for a display panel, which includes the following acts S11 to S14.

In the act S11, gray data of a display picture is converted into a gray voltage at a first refresh frequency.

In the act S12, an average gray voltage of the display picture is calculated according to the gray voltage of the display picture.

In the act S13, a display parameter matched with the display picture is determined according to the average gray voltage of the display picture.

In the act S14, a control signal of the display picture is outputted to the display panel according to the display parameter matched with the display picture. No control signal of the display picture is outputted to the display panel when there is no display parameter matched with the display picture.

In some exemplary embodiments, the control method of the present embodiment may be applied to a Display Driver Integrated Circuit (DDIC) chip. Taking a display apparatus adopting an Application Processor (AP), a DDIC chip, and a display panel architecture as an example, after the AP renders and generates image data, the AP sends the image data to the DDIC chip, and the DDIC chip controls the display panel to display an image according to the image data. In this example, the DDIC chip may output different control signals to the display panel according to different display pictures, thereby improving the display effect of the display panel.

In some exemplary embodiments, the control signal outputted to the display panel may include at least one of the followings: a display data keep signal, and an anode reset signal of a light emitting element of the display panel. In the present exemplary embodiment, different control signals may be provided to different display pictures according to display parameters for different display pictures, thereby achieving a better display effect.

In some exemplary embodiments, a display stage of the display picture may include: a refresh stage and a keep stage. The display parameter may include at least one of the followings: a display data keep voltage in the keep stage; and a first anode initial voltage in the refresh stage and a second anode initial voltage in the keep stage. In some examples, only the display data keep voltage matched with the display picture may be determined according to the average gray voltage of the display picture; or, only an anode initial voltage (including the first anode initial voltage and the second anode initial voltage) matched with the display picture may be determined according to the average gray voltage of the display picture; or, the display data keep voltage and an anode initial voltage matched with the display picture may be determined according to the average gray voltage of the display picture. In this example, the display effect of the display panel may be improved by selecting a better display parameter or combination.

In some exemplary embodiments, the act S14 may include at least one of the followings: outputting the display data keep signal to the display panel in the keep stage, where the display data keep signal is maintained at the display data keep voltage; and outputting the anode reset signal to the display panel, where the anode reset signal is maintained at the first anode initial voltage in the refresh stage and is maintained at the second anode initial voltage in the keep stage. In this example, the display data keep signal may be generated according to the display data keep voltage, and the anode reset signal may be generated according to the first anode initial voltage and the second anode initial voltage. In some examples, a range of the display data keep voltage may be about 0.2V to 7.0V. A range of the first anode initial voltage may be about −0.5V to −6.0V, and a range of the second anode initial voltage may be about −0.5V to −6.0V. This embodiment is not limited thereto.

In some exemplary embodiments, a first refresh frequency may be less than 60 Hz. The control method provided in this example is performed in a low frame rate drive state, thereby improving a low frame rate flicker effect of the display panel.

In some exemplary embodiments, the conversion of the gray data of the display picture and the calculation of the average gray voltage may be performed in accordance with a display unit. That is, gray data of each display unit is converted into a gray voltage, and an average gray voltage of all display units is calculated. In some examples, the display unit may be a pixel unit or may be a sub-pixel. However, this embodiment is not limited thereto.

Solutions of this embodiment will be described below through multiple examples.

Figure 2:
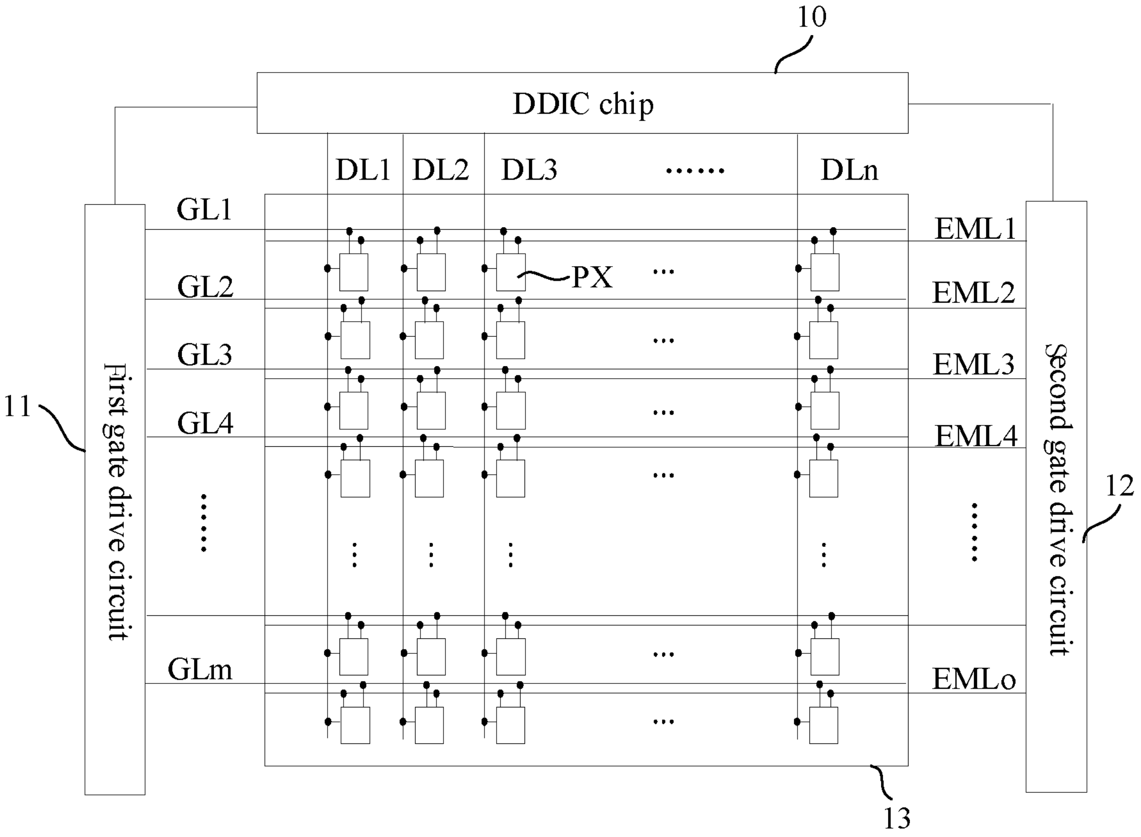
FIG. 2 is a schematic diagram of a display apparatus according to at least one embodiment of the present disclosure.

FIG. 2 is a schematic diagram of a display apparatus according to at least one embodiment of the present disclosure. In some exemplary embodiments, as shown in FIG. 2, the display apparatus of the present exemplary embodiment may include: a display panel and a control apparatus. The control apparatus may include a DDIC chip 10. The display panel may include: a pixel array 13, multiple first signal lines (for example, scan lines GL1 to GLm, light emitting control lines EML1 to EMLo) extending along a first direction, and multiple second signal lines (for example, data lines DL1 to DLn) extending along a second direction. The first direction (e.g. a horizontal direction) intersects with the second direction (e.g. a vertical direction), e.g., the first direction and the second direction may be perpendicular to each other. Herein, m, n, and o are all integers. A gate drive circuit (including, for example, a first gate drive circuit 11 and a second gate drive circuit 12) is also disposed on the display panel. The control apparatus 10 and the gate drive circuit may be configured to drive the pixel array 13.

In some exemplary embodiments, the DDIC chip 10 may provide a clock signal, a start signal, and the like adapted to a specification of the first gate drive circuit 11 to the first gate drive circuit 11, and provide a clock signal, a start signal, and the like adapted to a specification of the second gate drive circuit 12 to the second gate drive circuit 12. The first gate drive circuit 11 may generate scan signals provided to the scan lines GL1 to GLm by utilizing the clock signal, the start signal, and the like received from the DDIC chip 10. The second gate drive circuit 12 may generate light emitting control signals provided to the light emitting control lines EML1 to EMLm by utilizing the clock signal, the start signal, and the like received from the DDIC chip 10. The DDIC chip 10 may also be adapted to generate data signals provided to the data lines DL1 to DLn.

In some exemplary embodiments, the first gate drive circuit 11 may provide scan signals with on-level pulses sequentially to the scan lines GL1 to GLm. For example, the first gate drive circuit may be constructed in a form of a shift register, and may generate the scan signals by transmitting the start signal provided in a form of on-level pulse sequentially to a next-stage circuit under controlling of the clock signal. The second gate drive circuit 12 may provide light emitting control signals with off-level pulses sequentially to the light emitting control lines EML1 to EMLo. For example, the second gate drive circuit 12 may be constructed in a form of a shift register, and may generate the light emitting control signals by transmitting the start signal provided in a form of off-level pulse sequentially to a next-stage circuit under controlling of the clock signal. However, this embodiment is not limited thereto.

In some exemplary embodiments, the pixel array 13 may include multiple sub-pixels PX. One pixel unit may include three sub-pixels. The three sub-pixels are a red sub-pixel, a green sub-pixel, and a blue sub-pixel, respectively. However, this embodiment is not limited thereto. In some examples, a pixel unit may include four sub-pixels, and the four sub-pixels may be a red sub-pixel, a green sub-pixel, a blue sub-pixel, and a white sub-pixel respectively. In some examples, the sub-pixel may be in a shape of a rectangle, a rhombus, a pentagon, or a hexagon. When a pixel unit includes three sub-pixels, the three sub-pixels may be arranged side by side horizontally, side by side vertically, or in a shape of a Chinese character "E". When a pixel unit includes four sub-pixels, the four sub-pixels may be arranged side by side horizontally, side by side vertically, or in a shape of a square. However, this embodiment is not limited thereto.

In some exemplary embodiments, at least one sub-pixel PX includes: a light emitting element and a pixel circuit driving the light emitting element to emit light. The light emitting element is electrically connected with the corresponding pixel circuit. The light emitting element may be an OLED device, including an anode, a cathode, and an organic light emitting layer disposed between the anode and the cathode. In some examples, the pixel circuit may include multiple transistors and at least one capacitor. For example, the pixel circuit may be of a structure of 5T1C, 5T2C, 6T1C, 7T1C, or 8T1C, etc. However, this embodiment is not limited thereto.

Figure 3:
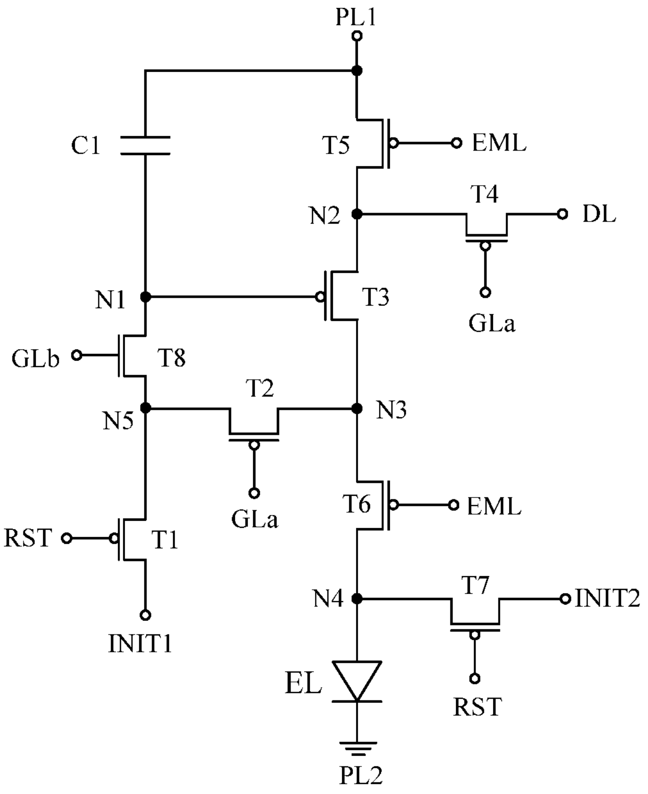
FIG. 3 is an equivalent circuit diagram of a pixel circuit according to at least one embodiment of the present disclosure.

FIG. 3 is a schematic diagram of a pixel circuit according to at least one embodiment of the present disclosure. In some exemplary embodiments, as shown in FIG. 3, the pixel circuit according to the present exemplary embodiment may be of the structure of 8T1C, that is, including a first transistor T1 to an eighth transistor T8 and a storage capacitor C1.

In some exemplary embodiments, the first transistor T1 to the seventh transistor T7 of the pixel circuit may be first type transistors, such as P-type transistors, and the eighth transistor T8 may be a second type transistor, such as an N-type transistor. However, this embodiment is not limited thereto. For example, the multiple transistors of the pixel circuit may each be a P-type transistor, or each be an N-type transistor.

In some exemplary embodiments, first type transistors (e.g., the first transistor T1 to the seventh transistor T7) of the pixel circuit may adopt a low temperature polysilicon thin film transistor, and a second type transistor (e.g., the eighth transistor T8) of a pixel circuit may adopt an oxide thin film transistor. An active layer of a Low Temperature Poly-Silicon thin film transistor is made of Low Temperature Poly-Silicon (LTPS), and an active layer of an oxide thin film transistor is made of an oxide semiconductor (Oxide). A Low Temperature Poly-Silicon thin film transistor has advantages such as a high mobility and fast charging, while an oxide thin film transistor has an advantage such as a low leakage current. The Low Temperature Poly-Silicon thin film transistor and the oxide thin film transistor are integrated on a display substrate to form a Low Temperature Polycrystalline Oxide (LTPO) display substrate, and advantages of both the Low Temperature Poly-Silicon thin film transistor and the oxide thin film transistor may be utilized, which may achieve low frame rate drive, reduce power consumption, and improve display quality. However, this embodiment is not limited thereto. For example, the multiple transistors of the pixel circuit may each adopt a Low Temperature Poly-silicon thin film transistor, or each adopt an oxide thin film transistor.

In some exemplary embodiments, as shown in FIG. 3, the pixel circuit is electrically connected with a first scan line GLa, a second scan line GLb, a data line DL, a first power supply line PL1, a second power supply line PL2, a light emitting control line EML, a first initial signal line INIT1, a second initial signal line INIT2, and a reset control line RST. In some examples, the first power supply line PL1 is configured to provide a constant first voltage signal VDD to a pixel circuit, the second power supply line PL2 is configured to provide a constant second voltage signal VSS to a pixel circuit, and the first voltage signal VDD is greater than the second voltage signal VSS. The first scan line GLa is configured to provide a first scan signal SCAN1 to the pixel circuit, the second scan line GLb is configured to provide a second scan signal SCAN2 to the pixel circuit, the data line DL is configured to provide a data signal DATA to the pixel circuit, the light emitting control line EML is configured to provide a light emitting control signal EM to the pixel circuit, and the reset control line RST is configured to provide a reset control signal RESET to the pixel circuit. The first initial signal line INIT1 is configured to provide a first initial signal for resetting a fifth node N5 and a first node N1, and the second initial signal line INIT2 is configured to provide a second initial signal (i.e., an anode reset signal) for resetting a fourth node N4 (i.e., the anode of the light emitting element EL).

In some exemplary embodiments, in an n-th row pixel circuit, the reset control line RST may be connected with a first scan line GLa of an (n−1)-th row pixel circuit to be inputted with a first scan signal SCAN1($n$−1), that is, a reset control signal RESET(n) is the same as the first scan signal SCAN1($n$−1). Thus, signal lines of the display substrate may be reduced, and a narrow frame of the display substrate may be achieved.

In some exemplary embodiments, as shown in FIG. 3, a control electrode of the third transistor T3 is electrically connected with the first node N1, a first electrode of the third transistor T3 is electrically connected with a second node N2, and a second electrode of the third transistor T3 is electrically connected with a third node N3. A control electrode of the fourth transistor T4 is electrically connected with the first scan signal line GLa, a first electrode of the fourth transistor T4 is electrically connected with the data signal line DL, and a second electrode of the fourth transistor T4 is electrically connected with the second node N2. A control electrode of the second transistor T2 is electrically connected with the first scanning line GLa, a first electrode of the second transistor T2 is electrically connected with the fifth node N5, and a second electrode of the second transistor T2 is electrically connected with the third node N3. A control electrode of the fifth transistor T5 is electrically connected with the light emitting control line E-L, a first electrode of the fifth transistor T5 is electrically connected with the first power supply line PL1, and a second electrode of the fifth transistor T5 is electrically connected with the second node N2. A control electrode of the sixth transistor T6 is electrically connected with the light emitting control line EML, a first electrode of the sixth transistor T6 is electrically connected with the third node N3, and a second electrode of the sixth transistor T6 is electrically connected with the fourth node N4. A control electrode of the first transistor T1 is electrically connected with the reset control line RST, a first electrode of the first transistor T1 is electrically connected with the first initial signal line INIT1, and a second electrode of the first transistor T1 is electrically connected with the fifth node N5. A control electrode of the seventh transistor T7 is electrically connected with the reset control line RST, a first electrode of the seventh transistor T7 is electrically connected with the second initial signal line INIT2, and a second electrode of the seventh transistor T7 is electrically connected with the fourth node N4. A control electrode of the eighth transistor T8 is electrically connected with the second scan line GL2, a first electrode of the eighth transistor T8 is electrically connected with the fifth node N5, and a second electrode of the eighth transistor T8 is electrically connected with the first node N1. A first electrode of the storage capacitor C1 is electrically connected with the first node N1, and a second electrode of the storage capacitor C1 is electrically connected with the first power supply line PL1.

In this example, the first node N1 is a connection point of the storage capacitor C1, the eighth transistor T8, and the third transistor T3, the second node N2 is a connection point of the fifth transistor T5, the fourth transistor T4, and the third transistor T3, the third node N3 is a connection point of the third transistor T3, the second transistor T2, and the sixth transistor T6, the fourth node N4 is a connection point of the sixth transistor T6, the seventh transistor T7, and the anode of the light emitting element EL, and the fifth node N5 is a connection point of the first transistor T1, the second transistor T2, and the eighth transistor T8.

Figure 4:
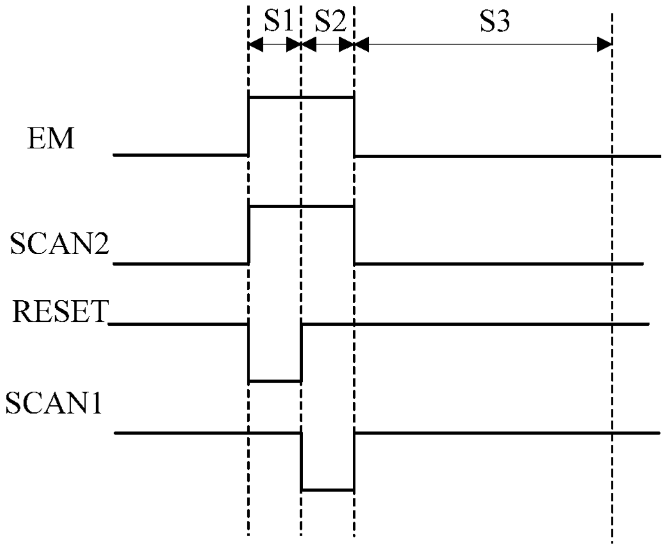
FIG. 4 is an operating timing diagram of the pixel circuit provided in FIG. 3.

FIG. 4 is a working timing diagram of the pixel circuit provided in FIG. 3. A working process of the pixel circuit shown in FIG. 3 will be described below with reference to FIG. 4. Herein, the first transistor T1 to the seventh transistor T7 of the pixel circuit are P-type transistors, and the eighth transistor T8 is an N-type transistor.

In some exemplary embodiments, as shown in FIG. 3 and FIG. 4, in a time length of one frame, the working process of the pixel circuit may include: a first stage S1, a second stage S2, and a third stage S3.

A first stage S1 is referred to as a reset stage. The reset control signal RESET provided by the reset control line RST is a low-level signal, so that the first transistor T1 and the seventh transistor T7 are turned on, and the second scan signal SCAN2 provided by the second scan line GLb is a high-level signal, so that the eighth transistor T8 is turned on. The first initial signal provided by the first initial signal line INIT1 is provided to the fifth node N5 and the first node N1 to initialize the first node N1 and clear an original data voltage in the storage capacitor C1. The first scan signal SCAN1 provided by the first scan line GLa is a high-level signal, and the light emitting control signal EM provided by the light emitting control line EML is a high-level signal, so that the fourth transistor T4, the second transistor T2, the fifth transistor T5, and the sixth transistor T6 are turned off. The seventh transistor T7 is turned on, so that the second initial signal provided by the second initial signal line INIT2 is provided to the fourth node N4 to initialize (reset) the anode of the light emitting element EL and clear its internal pre-stored voltage, completing initialization. In this stage, the light emitting element EL does not emit light.

The second stage S2 is referred to as a data writing stage or a threshold compensation stage. The first scan signal SCAN1 provided by the first scan line GLa is a low-level signal, the second scan signal SCAN2 provided by the second scan line GLb, the reset control signal RESET provided by the reset control line RST, and the light emitting control signal EM provided by the light emitting control line EML are all high-level signals, and the data line DL outputs the data signal DATA. In this stage, the first electrode of the storage capacitor C1 is of a low level, so the third transistor T3 is turned on. The first scan signal SCAN1 is a low-level signal, so that the second transistor T2 and the fourth transistor T4 are turned on. The second transistor T2, the fourth transistor T4, and the eighth transistor T8 are turned on, so that a data voltage Vdata outputted by the data line DL is provided to the first node N1 through the second node N2, the turned-on third transistor T3, the third node N3, the turned-on second transistor T2, the fifth node N5, and the turned-on eighth transistor T8, and a difference between the data voltage Vdata outputted by the data line DL and a threshold voltage of the third transistor T3 is charged to the storage capacitor C1, wherein a voltage at the first electrode (i.e., the first node N1) of the storage capacitor C1 is Vdata-|Vth|, wherein Vdata is the data voltage outputted by the data line DL, and Vth is the threshold voltage of the third transistor T3. The reset control signal RESET provided by the reset control line RST is a high-level signal, so that the first transistor T1 and the seventh transistor T7 are turned off. The light emitting control signal EM provided by the light emitting control line EML is a high-level signal, so that the fifth transistor T5 and the sixth transistor T6 are turned off.

The third stage S3 is referred to as an emitting stage. The light emitting control signal EM provided by the light emitting control line EML is a low-level signal, so that the fifth transistor T5 and the sixth transistor T6 are turned on. The second scan signal SCAN2 provided by the second scan line GLb is a low-level signal, so that the eighth transistor T8 is turned off. The first scan signal SCAN1 provided by the first scan line GLa and the reset control signal RESET provided by the reset control line RST are high-level signals, so that the second transistor T2, the fourth transistor T4, the seventh transistor T7, and the first transistor T1 are turned off. The first voltage signal VDD outputted by the first power supply line PLa provides a drive voltage to the anode of the light emitting element EL through the fifth transistor T5, the third transistor T3, and the sixth transistor T6 which are turned on, driving the light emitting element EL to emit light.

In a drive process of the pixel circuit, a drive current flowing through the third transistor T3 (i.e., a drive transistor) is decided by a voltage difference between the control electrode and the first electrode of the third transistor T3. Because the voltage of the first node N1 is Vdata-Vth, the driving current of the third transistor T3 is:

$$I = K\times(Vgs - Vth)^2 = K\times[(VDD - Vdata + |Vth|) - Vth]^2 = K\times[VDD - Vdata]^2;$$

herein, I is the drive current flowing through the third transistor T3, that is, a drive current for driving the light emitting element, K is a constant, Vgs is the voltage difference between the control electrode and the first electrode of the third transistor T3, Vth is the threshold voltage of the third transistor T3, Vdata is the data voltage outputted by the data line DL, and VDD is the first voltage signal outputted by the first power supply line PL1.

It may be seen from the above formula that a current flowing through the light emitting element is independent of the threshold voltage of the third transistor T3. Therefore, the pixel circuit according to the present embodiment may better compensate the threshold voltage of the third transistor T3.

Figure 5:
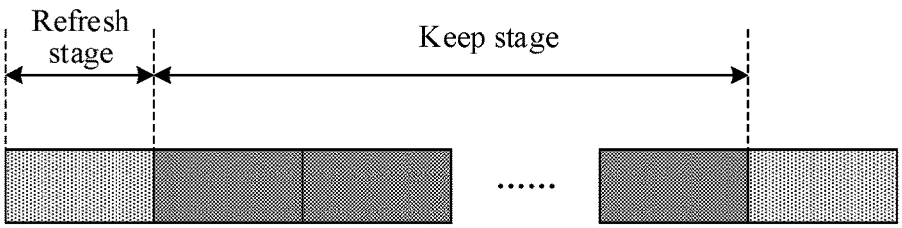
FIG. 5 is a schematic diagram of a frame skip drive mode according to at least one embodiment of the present disclosure.

In the display panel based on the LTPO technology, in order to achieve low frame rate drive, a frame skip drive mode is introduced. FIG. 5 is a schematic diagram of a frame skip drive mode according to at least one embodiment of the present disclosure. As shown in FIG. 5, the display stage of the display picture may include: a refresh stage and a keep stage. The refresh stage includes a refresh frame, wherein the refresh frame is a frame in which data refreshing needs to be performed. The keep stage includes multiple skip frames, wherein a skip frame is a frame in which data refreshing does not need to be performed and light is emitted by keeping previous picture data. The difference between the refresh frame and the skip frame is that: the skip frame keeps a data voltage previously written by the refresh frame without writing a new data voltage into the sub-pixel. In a low frame rate drive mode, a drive frequency is relatively low, for example, less than 60 Hz. Taking the drive frequency of 1 Hz as an example, 1 refresh frame and 59 skip frames may be included in 1 second. In this way, power consumption reducing may be achieved.

In some exemplary embodiments, within one refresh frame, the pixel circuit may write the data signal provided by the data line in accordance with working timing shown in FIG. 4. In the keep stage, since there is no need to perform data refreshing, the data line provides a display data keep signal, wherein the display data keep signal may be maintained at one constant voltage (i.e., the display data keep voltage), so as to achieve a purpose of saving power, reducing the power consumption. The second initial signal provided by the second initial signal line connected to the pixel circuit is an anode reset signal provided to the light emitting element. The second initial signal line provides anode reset signals with different voltage values in the refresh stage and the keep stage thus a low frame rate flicker effect may be improved, so that the display picture maintains a constant brightness. In this example, by loading an appropriate voltage to a source electrode of the drive transistor, a state of the drive transistor when emitting light is adjusted, so that the states of the drive transistor in the refresh frame and the skip frame are basically consistent, and a light emitting start voltage of the light emitting element is directly adjusted by the anode reset signal, so as to flatten brightness levels of the refresh frame and the skip frame, thereby improving the low frame rate flicker effect.

In some exemplary embodiments, the anode reset signal, the data signal, and the display data keep signal are generated by the DDIC chip. The DDIC chip may provide the data signal and the display data keep signal to the sub-pixel through the data line, and provide the anode reset signal to the sub-pixel through the second initial signal line.

In some exemplary embodiments, the DDIC chip acquires image data externally inputted and processes the image data externally inputted to obtain gray data of the sub-pixel (or the pixel unit). For example, the DDIC chip may receive the image data from an application processor. The DDIC chip may generate a Tearing Effect (TE) signal, which is used for preventing a tearing problem when the picture is refreshed in a process of image display. When being ready to refresh a next frame of image, the DDIC chip generates the TE signal. As an example, the AP sends the next frame of image data to the DDIC chip after a rising edge of the TE signal is monitored or that the TE signal is in a high-level state is detected.

In some exemplary embodiments, the DDIC chip may convert gray data of each sub-pixel (or pixel unit) of the display picture into a gray voltage according to a pre-stored gray conversion comparison table at the first refresh frequency (i.e., a refresh frequency less than 60 Hz). As shown in Table 1, the pre-stored gray conversion comparison table may include a column of gray data and a corresponding column of gray voltages, and there is a one-to-one corresponding relationship between the gray data and the gray voltages in the gray conversion comparison table.

TABLE 1

| Gray Conversion Comparison Table | |
|---|---|
| Gray data 1 | Gray voltage 1 |
| Gray data 2 | Gray voltage 2 |
| . . . | . . . |
| Gray data n | Gray voltage n |

In some examples, a range of the gray data may be 0 to 255, and a range of the gray voltages may be about 0.2V to 7.0V. For example, the gray voltage corresponding to the gray data L0 is 7.0V, the gray voltage corresponding to the gray data L8 is 6.0V, and the gray voltage corresponding to the gray data L255 is 0.2V. However, this embodiment is not limited thereto.

In some exemplary embodiments, a gray mapping function is satisfied between the gray data and the gray voltage, of any two adjacent gray data, in the gray conversion comparison table. That is, Voltage=f(Graydata) wherein Voltage represents the gray voltage and Graydata represents the gray data. In some examples, the gray mapping function may be a linear relationship or an exponential relationship. For example, the gray mapping function may be y=a*X+b or y X. Herein, X represents the gray data, y represents the gray voltage, and a and b are both constants. However, this embodiment is not limited thereto.

In some exemplary embodiments, for any two adjacent gray data in the gray conversion comparison table, gray mapping functions satisfied between the gray data and the gray voltages may be the same, or may be different. For example, for gray data 1 and gray data 2 in the gray conversion comparison table shown in Table 1, a first gray mapping function may be satisfied between the gray data and the gray voltage; and for the gray data 2 and the gray data 3, a second gray mapping function may be satisfied between the gray data and the gray voltage, and the first gray mapping function is different from the second gray mapping function. For example, the first gray mapping function may be a linear function, and the second gray mapping function may be an exponential function. However, this embodiment is not limited thereto.

In some exemplary embodiments, for gray data of any sub-pixel of the display picture, the DDIC chip may look for the gray voltage corresponding to the gray data in the gray conversion comparison table. If the gray voltage corresponding to the gray data is not found in the gray conversion comparison table, the gray data may be converted by interpolation. For example, the gray mapping function corresponding to the gray data to be converted is determined through the gray conversion comparison table, and the corresponding gray voltage is calculated by utilizing the gray mapping function.

In some exemplary embodiments, the DDIC chip may calculate an average gray voltage of the display picture after obtaining the gray voltage of each sub-pixel of the display picture. The average gray voltage is a ratio of a sum of gray voltages of all sub-pixels of the display picture to a total quantity of the sub-pixels.

In some exemplary embodiments, taking a display picture with a resolution of H*V as an example, an average value of gray voltages of each row of sub-pixels may be calculated first, and then the average gray voltage of the display picture may be calculated. For example, the average value of the gray voltages of each row of sub-pixels may be calculated in the following mode:

$$Vh_{avg} = \frac{\sum_{i=1}^{V} \text{Voltage}_i * W}{V};$$

herein, $Vh_{avg}$ is an average gray voltage of one row of sub-pixels; $\text{Voltage}_i$ is a gray voltage of an i-th sub-pixel in the sub-pixel row; and W is a weight factor. W may be set as needed, for example, it may be set to 1 by default. However, this embodiment is not limited thereto.

Then, the average gray voltage of the display picture is calculated as follows:

$$V_{avg} = \frac{\sum_{i=1}^{H} Vh_{avgi}}{H};$$

herein, $V_{avg}$ is the average gray voltage of the display picture.

However, the present embodiment is not limited to the mode for calculating the average gray voltage of the display picture. For example, the sum of the gray voltages of all the sub-pixels may be directly calculated, and then the average gray voltage may be obtained according to the ratio of the sum of the gray voltages to the total quantity of the sub-pixels. Or, an average value of gray voltages of each column of sub-pixels may be calculated first, and then the average gray voltage of the display picture may be calculated by utilizing average values of gray voltages of all sub-pixel columns.

In some exemplary embodiments, the DDIC chip may determine a corresponding display data keep voltage, a first anode initial voltage, and a second anode initial voltage according to a pre-stored parameter comparison table after calculating the average gray voltage of the display picture. As shown in Table 2, the pre-stored parameter comparison table may include one column of average gray voltages Vavg, one column of display data keep voltages, one column of first anode initial voltages Vinit2-1, and one column of second anode initial voltages Vinit2-2. Herein, there is a one-to-one corresponding relationship between the average gray voltages and the display data keep voltages, there is a one-to-one corresponding relationship between the average gray voltages and the first anode initial voltages, and there is a one-to-one relationship between the average gray voltages and the second anode initial voltages. In some examples, for any two adjacent average gray voltages in the parameter comparison table, the display data keep voltage, the first anode initial voltage, and the second anode initial voltage corresponding to the average gray voltage may be obtained by interpolation calculation.

TABLE 2

Parameter Comparison Table

| | | | |
|---|---|---|---|
| Average gray voltage 1 | Data keep voltage 1 | First anode initial voltage 1 | Second anode initial voltage 1 |
| Average gray voltage 2 | Data keep voltage 2 | First anode initial voltage 2 | Second anode initial voltage 2 |
| . . . | . . . | . . . | . . . |
| Average gray voltage N | Data keep voltage N | First anode initial voltage N | Second anode initial voltage N |

In some examples, a range of the average gray voltages may be about 0.2V to 7.0V, a range of the display data keep voltages may be about 0.2V to 7.0V, a range of the first anode initial voltages may be about −0.5V to −0.6V, and a range of the second anode initial voltages may be about −0.5V to −0.6V. For example, the average gray voltage is 7.0V, the corresponding display data keep voltage may be 7.0V, the first anode initial voltage may be −3.5V, and the second anode initial voltage may be −4.0V; the average gray voltage is 6.0V, the corresponding display data keep voltage may be 6.2V, the first anode initial voltage may be −3.6V, and the second anode initial voltage may be −4.0V; the average gray voltage is 0.2V, the corresponding display data keep voltage may be 1.0V, the first anode initial voltage may be −3.7V, and the second anode initial voltage may be −4.0V. However, this embodiment is not limited thereto.

In some exemplary embodiments, the average gray voltage may be directly proportional to the display data keep voltage in the parameter comparison table. The average gray voltage may be inversely proportional to an absolute value of a voltage difference between the first anode initial voltage and the second anode initial voltage in the parameter comparison table. For example, the larger the average gray voltage, the greater the display data keep voltage, and the smaller the voltage difference between the first anode initial voltage and the second anode initial voltage.

In some exemplary embodiments, the parameter comparison table may be obtained by performing data collecting and organization on an output display picture. The parameter combination provided by the parameter comparison table may achieve a best low frame rate flicker effect. In some examples, the parameter comparison table shown in Table 2 may be divided into multiple parameter comparison sub-tables. For example, a first parameter comparison sub-table may record the corresponding relationship between the average gray voltages and the display data keep voltages, and a second parameter comparison sub-table may record the corresponding relationship between the average gray voltages, and the first anode initial voltages and the second anode initial voltages. Or, a first parameter comparison sub-table may record the corresponding relationship between the average gray voltages and the display data keep voltages, a second parameter comparison sub-table may record the corresponding relationship between the average gray voltages and the first anode initial voltages, and a third parameter comparison sub-table may record the corresponding relationship between the average gray voltages and the second anode initial voltages. However, this embodiment is not limited thereto.

In some exemplary embodiments, after calculating an average gray voltage for any display picture, the DDIC chip may look for a display parameter corresponding to the average gray voltage from the parameter comparison table. After determining the display parameter of the display picture, the DDIC chip may dynamically output the display data keep signal and the anode reset signal to the display panel according to the display parameter.

Figure 6:
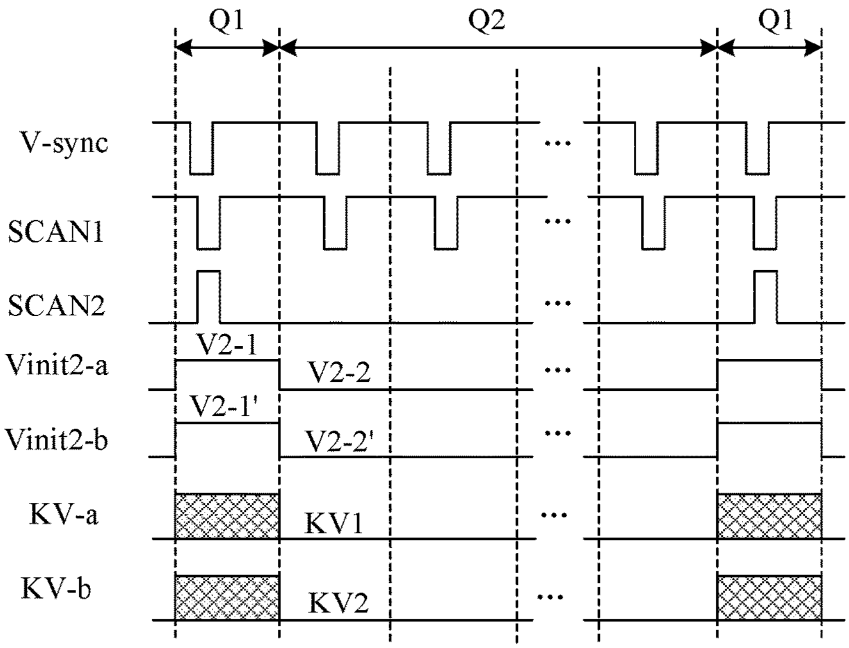
FIG. 6 is a schematic diagram of a wave of a control signal according to at least one embodiment of the present disclosure.

FIG. 6 is a schematic diagram of a wave of a control signal according to at least one embodiment of the present disclosure. In some exemplary embodiments, as shown in FIG. 6, V-sync is a vertical synchronous signal for defining a frame period (or a vertical synchronous period). Taking the display panel including the pixel circuit shown in FIG. 3 as an example, the first scan signal SCAN1 may be provided by the first scan line GLa, and the second scan signal SCAN2 may be provided by the second scan line GLb. In a refresh frame Q1, the pixel circuit writes the data signal provided by the data line under controlling of the first scan signal SCAN1 and the second scan signal SCAN2. In a keep stage Q2, the pixel circuit does not write a new data signal under controlling of the first scan signal SCAN1 and the second scan signal SCAN2.

In some exemplary embodiments, as shown in FIG. 6, a first display picture and a second display picture having different gray data are illustrated as an example. Vinit2-*a* is an anode reset signal corresponding to the first display picture, and Vinit2-*b* is an anode reset signal corresponding to the second display picture. The anode reset signal Vinit2-*a* is maintained at a first anode initial voltage V2-1 in the refresh stage Q1 and a second anode initial voltage V2-2 in the keep stage Q2. The anode reset signal Vinit2-*b* is maintained at a first anode initial voltage V2-1' in the refresh stage Q1 and a second anode initial voltage V2-2' in the keep stage Q2. The first anode initial voltage V2-1 is greater than the second anode initial voltage V2-2, and the first anode initial voltage V2-1' is greater than the second anode initial voltage V2-2'. The first anode initial voltages V2-1 and V2-1' may be different, and the second anode initial voltages V2-2 and V2-2' may be different. However, this embodiment is not limited thereto.

In some exemplary embodiments, as shown in FIG. 6, KV-a is a display data keep signal of the first display picture in the keep stage Q2, and the display data keep signal KV-a is maintained at a first display data keep voltage KV1 in the keep stage Q2. KV-b is a display data keep signal of the second display picture in the keep stage Q2, and the display data keep signal KV-b is maintained at a second display data keep voltage KV2 in the keep stage Q2. The first display data keep voltage KV1 may be different from the second display data keep voltage KV2, for example, the first display data keep voltage KV1 is greater than the second display data keep voltage KV2, or the second display data keep voltage KV2 is greater than the first display data keep voltage KV1. However, this embodiment is not limited thereto.

In the present exemplary embodiment, in the low frame rate drive mode, different display parameters are determined for display pictures with different gray data, and different control signals are provided to the display panel, so that an optimal low frame rate flicker effect can be achieved in any picture. Moreover, in the present embodiment, the matched display parameter is determined after the gray data of the display picture is converted into the gray voltage, so that a more accurate display parameter may be obtained, which is beneficial to improving the display effect.

Figure 7:
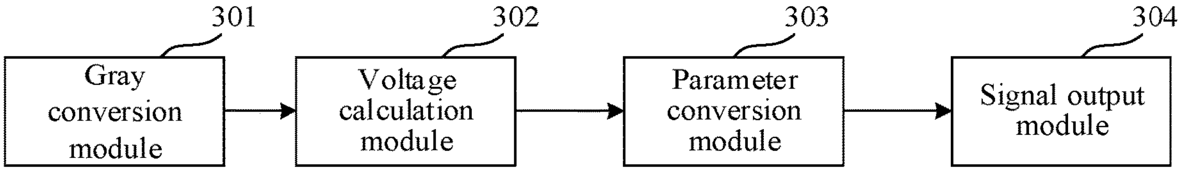
FIG. 7 is a schematic diagram of a control apparatus for a display panel according to at least one embodiment of the present disclosure.

FIG. 7 is a schematic diagram of a control apparatus for a display panel according to at least one embodiment of the present disclosure. In some exemplary embodiments, as shown in FIG. 7, the control apparatus of the present embodiment may include: a gray conversion module 301, a voltage calculation module 302, a parameter conversion module 303, and a signal output module 304. The gray conversion module 301 is configured to convert gray data of a display picture into a gray voltage at a first refresh frequency. The voltage calculation module 302 is configured to calculate an average gray voltage of the display picture according to the gray voltage of the display picture. The parameter conversion module 303 is configured to determine a display parameter matched with the display picture according to the average gray voltage of the display picture. The signal output module 304 is configured to output a control signal of the display picture to the display panel according to the display parameter matched with the display picture. Herein, the control signal includes at least one of the followings: a display data keep signal, and an anode reset signal of a light emitting element of the display panel.

In some exemplary embodiments, a display stage of the display picture may include: a refresh stage and a keep stage. The display parameter may include at least one of the followings: a display data keep voltage in the keep stage; and a first anode initial voltage in the refresh stage and a second anode initial voltage in the keep stage.

Figure 8:
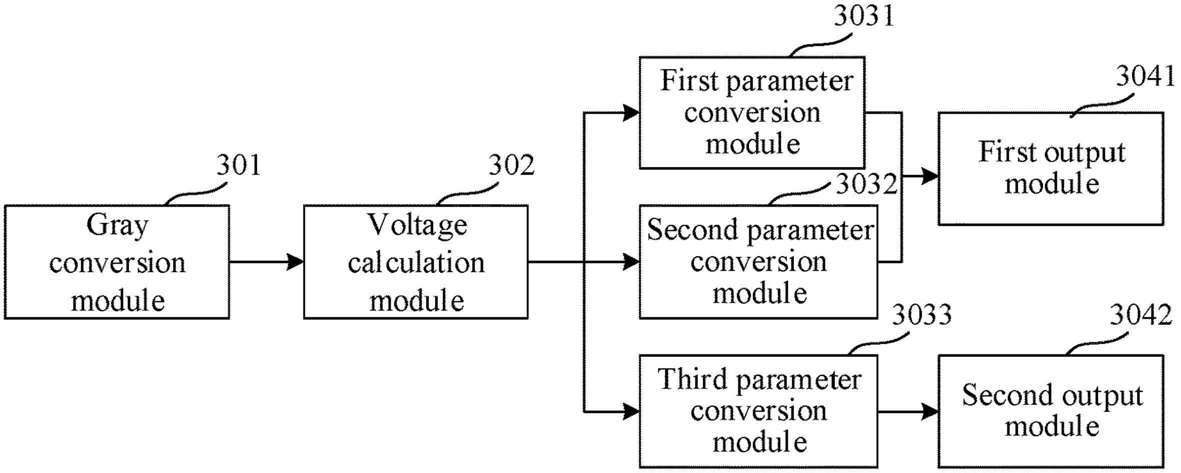
FIG. 8 is another schematic diagram of a control apparatus for a display panel according to at least one embodiment of the present disclosure.

FIG. 8 is another schematic diagram of a control apparatus for a display panel according to at least one embodiment of the present disclosure. In some exemplary embodiments, as shown in FIG. 8, the parameter conversion module 303 may include: a first parameter conversion module 3031, a second parameter conversion module 3032, and a third parameter conversion module 3033. The first parameter conversion module 3031 is configured to determine the first anode initial voltage matched with the display picture according to the average gray voltage of the display picture. The second parameter conversion module 3032 is configured to determine the second anode initial voltage matched with the display picture according to the average gray voltage of the display picture. The third parameter conversion module 3033 is configured to determine the display data keep voltage matched with the display picture according to the average gray voltage of the display picture.

In some exemplary embodiments, as shown in FIG. 8, the signal output module 304 may include: a first output module 3041 and a second output module 3042. The first output module 3041 is configured to output the anode reset signal of the display picture to the display panel according to the display parameter matched with the display picture. The second output module 3042 is configured to output the display data keep signal to the display panel according to the display parameter matched with the display picture.

Relevant description of the control apparatus for the display panel of the present embodiment may refer to the descriptions in the aforementioned embodiments, and thus will not be repeated here.

Figure 9:
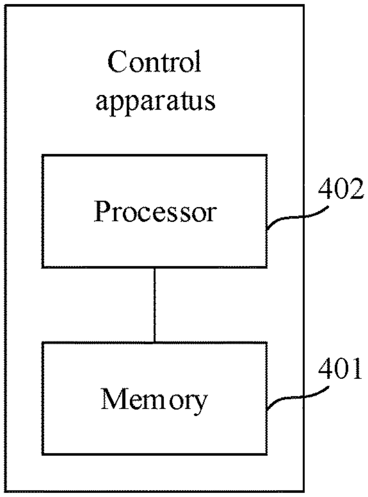
FIG. 9 is another schematic diagram of a control apparatus according to at least one embodiment of the present disclosure.

FIG. 9 is another schematic diagram of a control apparatus according to at least one embodiment of the present disclosure. In some exemplary embodiments, as shown in FIG. 9, the control apparatus of the present embodiment may include: a memory 401 and a processor 402. The memory 401 is configured to store a computer program, and the processor 402 is configured to execute the computer program to implement the aforementioned control method.

In some exemplary embodiments, the processor 402 of the control apparatus may include a processing apparatus such as a Microcontroller Unit (MCU), or a Field-Programmable Gate Array (FPGA), or the like. The memory 401 of the control apparatus may store a gray conversion comparison table, a parameter comparison table, as well as software programs and modules of application software, such as program instructions or modules corresponding to the method in the present embodiment. The processor 402 executes various function applications and data processing by running software programs and modules stored in the memory 401, for example, implements the method provided in the present embodiment. The memory 401 may include a high-speed random access memory, and may also include a non-volatile memory such as one or more magnetic storage apparatuses, flash memories, or other non-volatile solid-state memories. In some examples, the memory may include memories remotely provided with respect to the processor, and these remote memories may be connected with the control apparatus through a network. Examples of the above network include, but are not limited to, the Internet, an intranet, a local area network, a mobile communication network, and combinations thereof.

Figure 10:
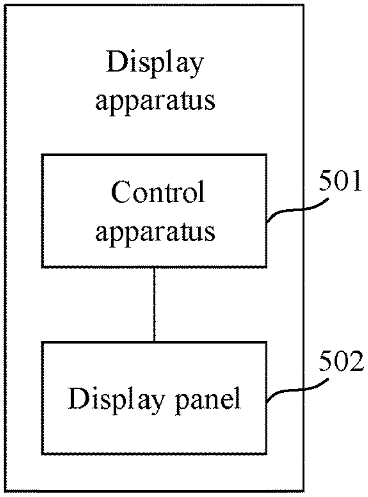
FIG. 10 is a schematic diagram of a display apparatus according to at least one embodiment of the present disclosure.

FIG. 10 is a schematic diagram of a display apparatus according to at least one embodiment of the present disclosure. In some exemplary embodiments, as shown in FIG. 10, the display apparatus of the present embodiment may include: a display panel 502 and a control apparatus 501. The control apparatus 501 is configured to provide a control signal to the display panel 502.

In some exemplary embodiments, the display panel 502 may include: a pixel array. The pixel array includes multiple sub-pixels, wherein at least one sub-pixel includes a light emitting element and a pixel circuit that drives the light emitting element to emit light. The pixel circuit includes: multiple transistors and at least one capacitor. Relevant description of the display apparatus of the present embodiment may refer to the descriptions in the aforementioned embodiments, and thus will not be repeated here.

In addition, at least one embodiment of the present disclosure further provides a non-transitory computer-readable storage medium, storing a computer program, wherein when the computer program is performed, the acts of the above control method are implemented.

Those of ordinary skills in the art may understand that all or some of the acts in the method, functional modules or units in the system and apparatus disclosed above may be implemented as software, firmware, hardware, and an appropriate combination thereof. In a hardware implementation, a division between functional modules or units mentioned in the above description does not necessarily correspond to a division of physical components. For example, a physical component may have multiple functions, or a function or an act may be performed by several physical components in cooperation. Some certain components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

The above shows and describes basic principles, main features, and advantages of the present disclosure. The present disclosure is not limited by the above embodiments. The above embodiments and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

The invention claimed is:

1. A control method for a display panel, comprising following acts performed by a processor:

converting gray data of a display picture into a gray voltage at a first refresh frequency;

calculating an average gray voltage of the display picture according to the gray voltage of the display picture;

determining a display parameter matched with the display picture according to the average gray voltage of the display picture; and outputting a control signal of the display picture to the display panel according to the display parameter matched with the display picture, wherein the control signal comprises at least one of: a display data keep signal for keeping a display data keep voltage matched with the display picture, and an anode reset signal of a light emitting element of the display panel, wherein a display stage of the display picture comprises: a refresh stage and a keep stage;

the display parameter comprises at least one of: the display data keep voltage of the keep stage; and a first anode initial voltage of the refresh stage and a second anode initial voltage of the keep stage, wherein no control signal of the display picture is outputted to the display panel-when there is no display parameter matched with the display picture.

2. The method of claim 1, wherein converting the gray data of the display picture into the gray voltage comprises:

for gray data of each display unit of the display picture, looking for a gray voltage corresponding to the gray data in a stored gray conversion comparison table.

3. The method of claim 2, wherein converting the gray data of the display picture into the gray voltage further comprises:

when the gray voltage corresponding to the gray data of a display unit is not found in the gray conversion comparison table, calculating the gray voltage corresponding to the gray data by utilizing a preset gray mapping function.

4. The method of claim 2, wherein calculating the average gray voltage of the display picture according to the gray voltage of the display picture comprises:

calculating an average value of gray voltages of each display line of the display picture, and then calculating the average gray voltage of the display picture by utilizing average values of gray voltages of all display lines.

5. The method of claim 1, wherein calculating the average gray voltage of the display picture according to the gray voltage of the display picture comprises:

calculating an average value of gray voltages of each display line of the display picture, and then calculating the average gray voltage of the display picture by utilizing average values of gray voltages of all display lines.

6. The method of claim 1, wherein determining the display parameter matched with the display picture according to the average gray voltage of the display picture comprises:

looking for a display parameter matched with the average gray voltage of the display picture from a stored parameter comparison table;

wherein, the parameter comparison table records at least one of: a mapping relationship between an average gray voltage and the display data keep voltage, and a mapping relationship between an average gray voltage, and a first anode initial voltage and a second anode initial voltage.

7. The method of claim 6, wherein the average gray voltage is directly proportional to the display data keep voltage in the parameter comparison table; and the average gray voltage is inversely proportional to an absolute value of a voltage difference between the first anode initial voltage and the second anode initial voltage in the parameter comparison table.

8. The method of claim 1, wherein outputting the control signal of the display picture to the display panel according to the display parameter matched with the display picture comprises at least one of:

in the keep stage, outputting the display data keep signal to the display panel, wherein the display data keep signal is maintained at the display data keep voltage; and outputting the anode reset signal to the display panel, wherein the anode reset signal is maintained at the first anode initial voltage in the refresh stage and is maintained at the second anode initial voltage in the keep stage.

9. The method of claim 1, wherein the first refresh frequency is less than 60 Hz.

10. A control apparatus, comprising: a memory and a processor; wherein the memory is configured to store a computer program, and the processor is configured to execute the computer program to implement the control method of claim 1.

11. A non-transitory computer-readable storage medium, storing a computer program, wherein when the computer program is performed, the control method of claim 1 is implemented.

12. A control apparatus for a display panel, comprising a chip configured to:

convert gray data of a display picture into a gray voltage at a first refresh frequency;

calculate an average gray voltage of the display picture according to the gray voltage of the display picture;

determine a display parameter matched with the display picture according to the average gray voltage of the display picture; and output a control signal of the display picture to the display panel according to the display parameter matched with the display picture, wherein the control signal comprises at least one of: a display data keep signal, and an anode reset signal of a light emitting element of the display panel, wherein a display stage of the display picture comprises: a refresh stage and a keep stage;

the display parameter comprises at least one of: a display data keep voltage of the keep stage; and a first anode initial voltage of the refresh stage and a second anode initial voltage of the keep stage, no control signal of the display picture is outputted to the display panel when there is no display parameter matched with the display picture.

13. The control apparatus of claim 12, wherein the chip is configured to:

determine, according to the average gray voltage of the display picture, the first anode initial voltage matched with the display picture;

determine, according to the average gray voltage of the display picture, the second anode initial voltage matched with the display picture; and/or determine, according to the average gray voltage of the display picture, the display data keep voltage matched with the display picture.

14. The control apparatus of claim 12, wherein the chip is configured to:

output the anode reset signal of the display picture to the display panel according to the display parameter matched with the display picture; and/or output the display data keep signal of the display picture to the display panel according to the display parameter matched with the display picture.

15. A display apparatus, comprising a display panel and the control apparatus of claim 12, wherein the control apparatus is configured to provide a control signal to the display panel.

16. The display apparatus of claim 15, wherein the display panel comprises: a pixel array, wherein the pixel array comprises a plurality of sub-pixels, and at least one sub-pixel comprises a light emitting element and a pixel circuit driving the light emitting element to emit light; and the pixel circuit comprises a plurality of transistors and at least one capacitor.

* * * * *